No. 719,824. PATENTED FEB. 3, 1903.
H. T. MAKER.
ELECTRIC BRUSH HOLDER.
APPLICATION FILED NOV. 12, 1902.
NO MODEL.

Witnesses:
Geo. W. Young.
Chas. L. Goss.

Inventor:
Harry T. Maker
By Whitler Flanders Smith Bothwin & Wiles
Attorneys.

THE NORRIS PETERS CO., PHOTO-LITHO., WASHINGTON, D. C.

UNITED STATES PATENT OFFICE.

HARRY T. MAKER, OF MILWAUKEE, WISCONSIN.

ELECTRIC BRUSH-HOLDER.

SPECIFICATION forming part of Letters Patent No. 719,824, dated February 3, 1903.

Application filed November 12, 1902. Serial No. 130,962. (No model.)

*To all whom it may concern:*

Be it known that I, HARRY T. MAKER, a citizen of the Dominion of Canada, residing at Milwaukee, in the county of Milwaukee and State of Wisconsin, have invented certain new and useful Improvements in Electric Brush-Holders, of which the following is a specification, reference being had to the accompanying drawings, forming a part thereof.

This invention relates to holders for carbon or similar brushes. Its main objects are to simplify and improve the construction and operation of brush-holders of this class; and it consists in certain novel features of construction and in the arrangement and combinations of parts hereinafter particularly described, and pointed out in the claims.

In the accompanying drawings like letters designate the same parts in the several figures.

Figure 1:
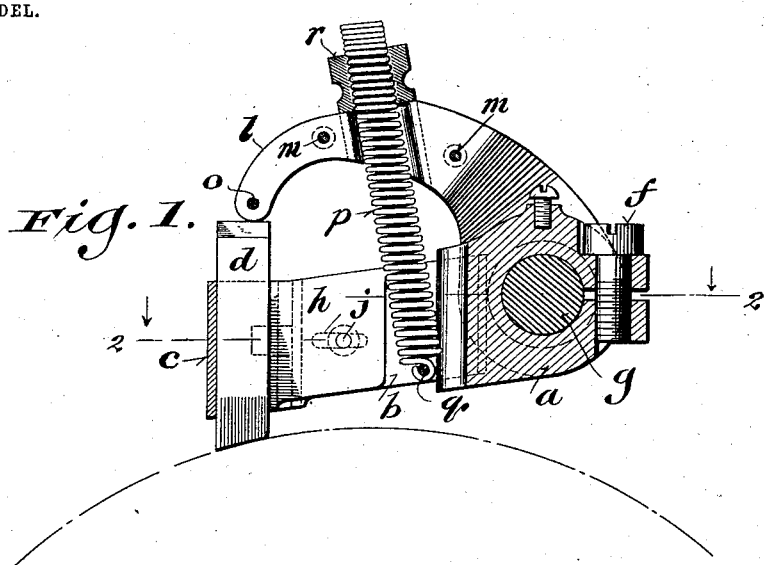
Figure 2:
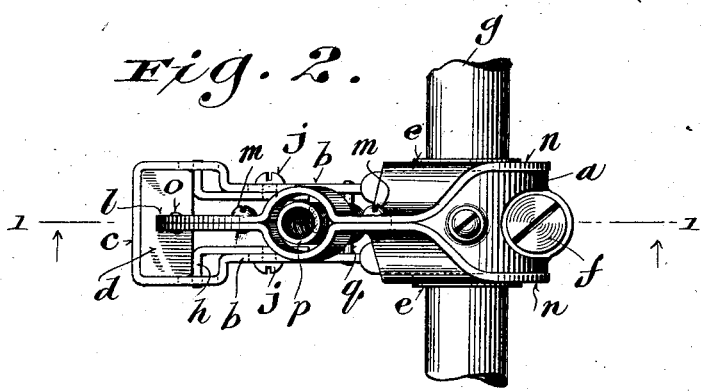
Figure 3:
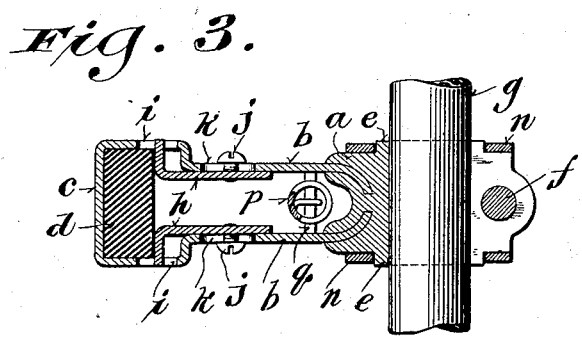

Figure 1 is a vertical longitudinal section on the line 1 1, Fig. 2, of a brush-holder embodying my improvements. Fig. 2 is a plan view of the same, the tension-nut being removed; and Fig. 3 is a longitudinal section on the line 2 2, Fig. 1, through the brush-supporting arm.

The brush-supporting arm or member of the holder consists of a split cast-metal hub $a$ and a sheet-metal arm $b$, formed at one end into a sleeve $c$ to approximately fit the brush $d$ and embedded at the opposite end in the hub $a$. In the present case the sleeve $c$ is of rectangular form to receive and hold an ordinary carbon brush. The sides of the arm $b$ are separated from each other, leaving a space between them opening into the sleeve $c$, as shown in Figs. 2 and 3.

The hub $a$ is formed at the ends with circular bosses $e$ $e$ concentric with its bore, and it is provided with a clamping-screw $f$, by means of which it is adjustably secured on a cylindrical stud or rod $g$ in the usual manner.

To take up play between the brushes, which vary more or less in thickness, and the sleeve $c$, two adjustable supports or bearings $h$ $h$ are provided. These supports or bearings may be conveniently stamped out of sheet metal, and they are guided and held in place by projections engaging transverse slots $i$ in opposite sides of the sleeve $c$ and by screws $j$ $j$, threaded therein and passing through similar slots $k$ $k$ in the side sections or members of the arm $b$. Obviously a single adjustable support or bearing might be substituted for the two supports or bearings, which, however, can be more readily and cheaply stamped out of sheet metal.

$l$ is a tension-arm composed of two parts or sections, which may be conveniently and economically stamped from sheet metal and secured together by screws $m$ $m$. The sections are bent away from each other near one end and formed with eyes $n$ $n$, which are fitted to turn on the bosses $e$ $e$. Between the ends of the arm $l$ the component sections are bent outwardly in semicylindrical form to produce an opening for the passage of a tension-spring and to form a seat or bearing for a tension-nut. At the free end of the arm $l$, which is adapted to bear against the end of a brush $d$, held in the sleeve $c$, the parts or sections may be permanently secured together by a rivet $o$.

A spiral tension-spring $p$, attached at one end to the supporting-arm $b$ in the recess or space between its sides by means of a cross-pin $q$ or otherwise, passes through the opening therefor in the tension-arm $l$ and is provided with a nut $r$, which is threaded directly thereon. The pitch of the screw-thread in the nut is greater than the normal pitch of the spiral spring, so that the spring is spread and strained by screwing the nut thereon, and the nut is thus held in place when adjusted without other means of locking it.

The arms $b$ and $l$ may be made of sheet-brass and the hub $a$ of some metal or composition whose melting-point is somewhat lower than that of brass, so that the arm $b$ may be cast therein, as indicated in Fig. 3, without melting it. A metal mold may be conveniently employed for casting the hub, so that it will require little or no machine-work to finish it.

The construction herein shown and described is strong, light, simple, and cheap, as the parts require little or no hand or machine work to finish them and they are easily assembled. The tension device is also extremely simple and effective. By threading the tension-nut directly on the spiral of the spring a greater effective length of spring is obtained than can be obtained within the same compass when the tension-nut is threaded on a screw to which the spring is attached, the screw in this case reducing the effective length of the spring.

With the tension device herein shown and described the tension-arm $l$ may be turned back without injuriously straining and affecting the resiliency of the spring. Besides, by reason of its greater effective length and increased elasticity, the tension-arm is capable of a wider range of movement with less variation in the tension of the spring than could be secured if the spring were connected with the nut by an ordinary screw.

Various changes in minor details of construction may be made without departing from the principle and intended scope of the invention.

I claim—

1. A brush-holder comprising a cast-metal hub and a sheet-metal brush-supporting arm formed at one end with a sleeve for the brush and embedded at the opposite end in said hub, substantially as described.

2. A brush-holder comprising a cast-metal hub formed at the end with circular bosses, a sheet-metal brush-supporting arm formed at one end into a sleeve for the brush and embedded at the opposite end in said hub, and a tension-arm formed of two pieces of sheet metal secured together side by side and formed with eyes fitted to turn on said bosses, substantially as described.

3. A brush-holder comprising a split cast-metal hub provided with a clamping-screw and formed at the ends with circular bosses, a sheet-metal brush-supporting arm formed at one end with a sleeve and embedded at the opposite end in said hub, a tension-arm composed of two sheet-metal parts which are formed with eyes fitted to turn on said bosses and are clamped together by screws, said parts being bent away from each other between their ends and forming a bearing for a tension-nut and an opening for a tension-spring, and a tension-spring attached to said brush-supporting arm, passing through the opening therefrom in said tension-arm and provided on the opposite side thereof with a nut, substantially as described.

4. In a brush-holder the combination of a brush-supporting arm provided with a sleeve for a brush, and an adjustable support attached to said arm and projecting into one side of said sleeve, substantially as described.

5. In a brush-holder the combination of a sheet-metal brush-supporting arm provided with a hub at one end and formed with a sleeve to receive the brush at the other end and brush-supports guided by transverse slots in opposite sides of said sleeve and adjustably attached to said arm by screws passing through longitudinal slots in its side members, substantially as described.

6. In a brush-holder the combination of a brush-supporting arm, a tension-arm pivotally connected therewith, a spiral spring attached at one end to said supporting-arm, and a nut having a bearing on said tension-arm and threaded upon said spring, substantially as described.

7. In a brush-holder the combination of a brush-supporting arm, a tension-arm pivotally connected therewith, a spiral spring attached at one end to said supporting-arm and a nut having a bearing on said tension-arm and threaded upon said spring, whose normal spiral is of less pitch than the thread of said nut, substantially as described.

8. In a brush-holder the combination of an open brush-supporting arm having a sleeve at one end to receive and hold the brush, a tension-arm pivotally connected with said supporting-arm and having an opening for the passage through it of a tension-spring, and a spiral tension-spring attached at one end to said supporting-arm in the opening between its sides and passing through the opening in the tension-arm, and a nut seated on said tension-arm and threaded directly on the spiral of said spring, which is normally of less pitch than the thread of said nut, substantially as described.

In witness whereof I hereto affix my signature in presence of two witnesses.

HARRY T. MAKER.

Witnesses:
 CHAS. L. GOSS,
 HENRY WINKENWERDER.